(12) United States Patent
Nemoto (10) Patent No.: US 8,777,173 B2
(45) Date of Patent: Jul. 15, 2014

(54) HOLDING APPARATUS

(75) Inventor: Takehiko Nemoto, Yokohama (JP)

(73) Assignee: Nifco Inc., Yokohama-shi (JP)

( * ) Notice: Subject to any disclaimer, the term of this patent is extended or adjusted under 35 U.S.C. 154(b) by 158 days.

(21) Appl. No.: 13/511,842

(22) PCT Filed: Dec. 1, 2010

(86) PCT No.: PCT/JP2010/071483
§ 371 (c)(1),
(2), (4) Date: Jul. 9, 2012

(87) PCT Pub. No.: WO2011/068120
PCT Pub. Date: Jun. 9, 2011

(65) Prior Publication Data
US 2012/0280530 A1 Nov. 8, 2012

(30) Foreign Application Priority Data
Dec. 2, 2009 (JP) .................. 2009-274145

(51) Int. Cl.
*A47G 1/10* (2006.01)
(52) U.S. Cl.
USPC ......... 248/316.4; 248/685; 379/455; 224/929
(58) Field of Classification Search
CPC .................. B60R 11/0241; B60R 2011/0071; B60R 11/0252; B60R 2011/0059; H04M 1/04; H04M 1/6075; F16M 13/00
USPC ............ 248/685, 689, 488, 540, 74.4, 228.3, 248/231.41, 316.4, 316.6; 379/455, 445, 379/454; 224/929
See application file for complete search history.

(56) References Cited

U.S. PATENT DOCUMENTS 1,349,225 A * 8/1920 Rosenblum .................. 24/527
1,760,346 A * 5/1930 Correa ......................... 24/72.5
(Continued)

FOREIGN PATENT DOCUMENTS

| CN | 2167486 Y | 6/1994 |
| CN | 2485183 Y | 4/2002 |

(Continued)

OTHER PUBLICATIONS

Korea Patent Office, Office Action for KR 10-2012-7016709, Sep. 30, 2013.

(Continued)

*Primary Examiner* — Bradley Duckworth
(74) *Attorney, Agent, or Firm* — Manabu Kanesaka (57) ABSTRACT

A holding apparatus for removably holding an article has a base, a slider, and an urging member. The base has a stationary holding part provided on one end side of a placement part, and an operating button supported to be capable of swinging through a pivot part. The slider has a movable holding part for holding an article together with the stationary holding part, and a teeth part being provided following a sliding direction. The operating button has an operating part on one end side of the pivot part, and a claw part provided on the other end side for coupling and decoupling with the teeth part of the slider. The operating button is constantly urged by an urging spring so that sliding of the slider is restricted in a state in which the claw part is coupled with the teeth part. The coupling is released by an operation opposing the urging force of the operating part so that the slider is allowed to slide against the urging force of the urging member.

4 Claims, 8 Drawing Sheets

(56) References Cited

U.S. PATENT DOCUMENTS

| | | | |
|---|---|---|---|
| 3,140,069 A * | 7/1964 | McBurney et al. | 248/514 |
| 5,836,563 A * | 11/1998 | Hsin-Yung | 248/316.4 |
| 6,085,113 A * | 7/2000 | Fan | 455/569.1 |
| 6,229,891 B1 * | 5/2001 | Chen | 379/446 |
| 6,959,899 B2 * | 11/2005 | Yeh | 248/346.03 |
| 7,140,582 B1 * | 11/2006 | Miller et al. | 248/231.41 |
| 7,407,143 B1 * | 8/2008 | Chen | 248/309.1 |
| 7,540,459 B2 * | 6/2009 | Asano et al. | 248/309.1 |
| 2012/0127647 A1 * | 5/2012 | Liang et al. | 361/679.31 |
| 2012/0257345 A1 * | 10/2012 | Hulet | 361/679.32 |
| 2012/0257346 A1 * | 10/2012 | Hulet | 361/679.32 |

FOREIGN PATENT DOCUMENTS

| | | |
|---|---|---|
| CN | 201040509 Y | 3/2008 |
| DE | 195 42 720 C | 6/1997 |
| JP | H07-293384 A | 11/1995 |
| JP | 3028591 U | 9/1996 |
| JP | 2003-273990 A | 9/2003 |
| JP | 4108987 B | 4/2008 |
| JP | 2008-202771 A | 9/2008 |
| JP | 2009-083766 A | 4/2009 |
| JP | 2009-214724 | 9/2009 |
| JP | 2010-264812 A | 11/2010 |

OTHER PUBLICATIONS

China Patent Office, "Office Action for CN 201080054555.4", Dec. 4, 2013.

\* cited by examiner

HOLDING APPARATUS

TECHNOLOGICAL FIELD

The present invention relates to a holding apparatus, and relates in particular to a holding apparatus that is ideal for the case when using or temporarily holding a portable telephone, music player, other portable device, or similar article in a vehicle compartment.

BACKGROUND TECHNOLOGY

The holding device as subject is of a type that is used, for example, when a portable telephone or other article is used and temporarily held in a clipped state inside a vehicle compartment. The structural characteristics, as in the example in patent document 1 or 2, include at least a base (base part) for placing an article, a slider (sliding member or holding member) arranged slidably on the base, and an urging member for urging the slider, and articles having different width dimensions can be held by varying the holding width through sliding of the slider.

Describing in more detail, in the holding structure in patent document 1, there are holding parts in which left and right sliders are laced oppositely, the sliders are placed slidably on both sides of the base, and are slid in opposition to an urging force of an urging member. Also, an article is held between both holding parts while operating the sliders to slide against the urging force.

In the holding structure in patent document 2, there are holding parts in which left and right sliders are placed oppositely, and the sliders are placed slidably on both sides of the base; there are also a gear, an operating button for coupling and decoupling with the gear, and an urging member for urging the button in a direction of coupling with the gear, and there are provided locking device for keeping the left and right sliders in position after adjustment of sliding. When not in use, the sliders enlarge the space of the holding it to the maximum by the urging force, and that state is maintained by the locking device. An article is placed between the holding parts and is held from that state by operating the sliders to slide in a direction of approaching to each other against the urging force. Each slider is kept in the position after adjustment of sliding by the locking device. Also, to release holding of the article, the button is pushed against the urging force, upon which the coupling with the gear is released, and each slider is slid by the urging force up to the position where the holding width is enlarged to the maximum.

Each holding apparatus above is attached by adhesive tape, or the like, to a vehicle compartment wall, or the like, and therefore impedes safety or becomes a nuisance when not in use. As a countermeasure, there is devised a drawer structure as in the example in patent document 3, in which the apparatus is placed in storage inside a dashboard, or the like, and is drawn out when in use

PRIOR ART DOCUMENTS

Patent Documents

Patent Document 1: Japanese Patent Publication No. 4108987

Patent Document 2: German Patent Publication No 19542720

Patent Document 3: Japanese Patent Publication No. 2009-214724

SUMMARY OF THE INVENTION

Problems to be Solved by the Invention

The holding in patent document 1 is a simple type, but the holding force for holding the article is proportional to the urging force, and therefore, for example, when the urging force is set weakly, the holding force also is insufficient, but conversely, when the urging force is set greatly, it becomes a factor impairing the holding operation.

An inconvenience as above is solved with the holding structure in patent document 2. An article is placed on the base, the slider is operated to slide and the article is held in that state, and that state is maintained by the locking device. Also, the holding of the article can be released instantaneously by a push operation of the operating button. However, in this holding structure, the locking device is such that the gear and the coupling part provided on the side of the operating button are always engaged as long as the button is not pushed against the urging force, and therefore in the course of operating the slider to slide in the direction of reducing the holding width, a "clicking" sound is produced, originating in the fact that the gear rotates while contacting with the coupling part on the side of the operating button, and the appearance of high quality is impaired.

Therefore, an object of toe present invention is to simplify the structure and to make the structure advantageous in terms of accessibility to the storage part and in terms of storage space in the case when adopting a storage structure.

Means for Solving the Problems

In order to achieve the abovementioned object, the present invention, specified with reference to aspects, is a holding apparatus, having a base having an article placement part, a slider arranged slidably on said base, and an urging member for urging said slider, and being used for removably holding an article, wherein said base has a stationary holding part provided on one end side of said placement part, and an operating button supported to be capable of swinging through a pivot part; said slider has a movable holding part for holding said article K together with said stationary holding part, and a teeth part provided following a sliding direction; and said operating button has an operating part on one end side of said pivot part, and a claw part provided on the other end side for coupling and decoupling with the teeth part of said slider, and is constantly urged by an urging spring so that sliding of the slider is restricted in a state in which said claw part is coupled with said teeth part, and said coupling is released by an operation opposing the urging force of said urging spring of said operating button so that said slider is allowed to slide against the urging force of said urging member.

The above invention is preferably embodied as described below.

(1) A configuration in which said base is switchable to be inverted on the case through the pivot part, between a stored position in which a case opening is closed by a surface on a side opposite a side where said stationary holding part is projected and an in-use state in which the side where said stationary holding part is projected is exposed from the case opening, and is locked to be releasable both in said stored position and in the in-use state. In this case, by the configuration for inversion of the base on the case and the configuration for elastic locking in the stored position and the in-use state, the depth dimension of the case is easier to control while maintaining convenience of use compared with a drawer configuration as in patent document 3, and this is ideal in the case when the depth space on the side of the vehicle compartment wall is constrained.

(2) Instead of the above configuration, a configuration in which a stopper is provided, being placed on said base slidably in the same direction as said slider, being slid by an urging force of a spring member so as to couple with a coupling hole provided on said case whereby inversion of said base from the in-use state to the storage direction is prevented, and being slid in a direction of releasing the coupling with said coupling hole in linkage with said slider being slid in a direction of moving away from said stationary holding part by the urging force of said urging member.

(3) A configuration in which said claw part has a teeth shape for engaging with said teeth part, and has a two-stage configuration having upper teeth and lower teeth. In this case, when the claw part on the side of the operating button has a teeth shape for engaging with the teeth part on the side of the slider, and has a two-stage configuration having upper teeth and lower teeth, it is preferable because the coupling force is increased and malfunction is prevented.

With this two-stage configuration, in order to increase the coupling force, it is preferable that, for example, the angle of the upper teeth be set to vertical and the angle of the lower teeth be set to a suitable angle, and that the teeth shape of the teeth part on the side of the slider also likewise be made as a two-stage configuration and the angles be changed accordingly.

(4) A configuration in which said stationary holding part and/or movable holding part has a cushion material additionally provided on a holding surface, and said article is elastically held through said cushion material. In this case, the object article can be clipped more assuredly between the stationary holding part and the movable holding part, and through the cushion material provided on the holding surface.

Effects of the Invention

In the present invention, the slider is at the maximum distance (maximum holding width between the stationary holding part and the movable holding part) on the base by the urging force of the urging member, and the claw part on the side of the operating button is coupled with the teeth part on the side of the base so that the slider is restricted against sliding. In this structure, an article is placed on the placement part of the base, the coupling is then released by a push operation of the operating button opposing the urging force of the urging spring, the slider is operated to slide in the direction of reducing the holding width against the urging force of the urging member, and the finger is then removed from the operating button, upon which the article is clipped between the stationary holding part and the movable holding part, and the slider is restricted from sliding by the coupling between the claw part on the side of the operating button and the teeth part on the side of the base. Also, from this clipped state, the operating button is push operated against the urging force of the urging spring so that the coupling is released, upon which the slider is slid in the direction of enlarging the holding width by the urging force of the urging member, and the article therefore can be removed with one touch.

Also, in the present invention above, compared with patent document 1, an article can be held more stably without being affected by the magnitude of the urging force acting on the slider, and compared with patent document 2, teeth are rendered unnecessary and the structure is simplified, and the sound (the abovementioned clicking sound) originating in the engagement between the coupling part on the side of the button and the teeth can be eliminated.

BRIEF DESCRIPTION OF THE DRAWINGS

FIGS. 1(a)-1(c) illustrate a holding apparatus according to a embodiment of the present invention, wherein

EMBODIMENTS OF THE INVENTION

An embodiment of the present invention is described below while referring to the attached drawings. This description elucidates the apparatus structure, and then addresses the operating characteristics.

(Apparatus structure) The holding apparatus in the embodiment of the present invention includes a holder 9 for holding an article K, and a case 1 for invertingly storing the holder 9. Of these, the case 1 has elastic locking springs 18, or the like, being attached to both sides. The holder 9 has a base 2 including a roughly L-shaped body 20 and a cover 30 being assembled on an upper face of the body 20; a slider 4 being placed slidably on the base 2; an operating button 5 being supported to be capable of swinging through a shaft 3 as a pivot part on the base 2; an urging member S1 for accumulating an urging force by sliding of the slider 4 and sliding the slider 4 by the accumulated urging force; and a stopper 6 being placed slidably in the same direction as the slider 4 on the base 2 and being used for maintaining an in-use state by coupling in a coupling hole on the case 1 in an article-holding state of the base 2. The case 1, base 2, slider 4, operating button 5, and stopper 6 all are made with resin moldings, but material other than resin also is allowable. The structure of each member is elucidated below together with an outline of assembly.

Figure 2:
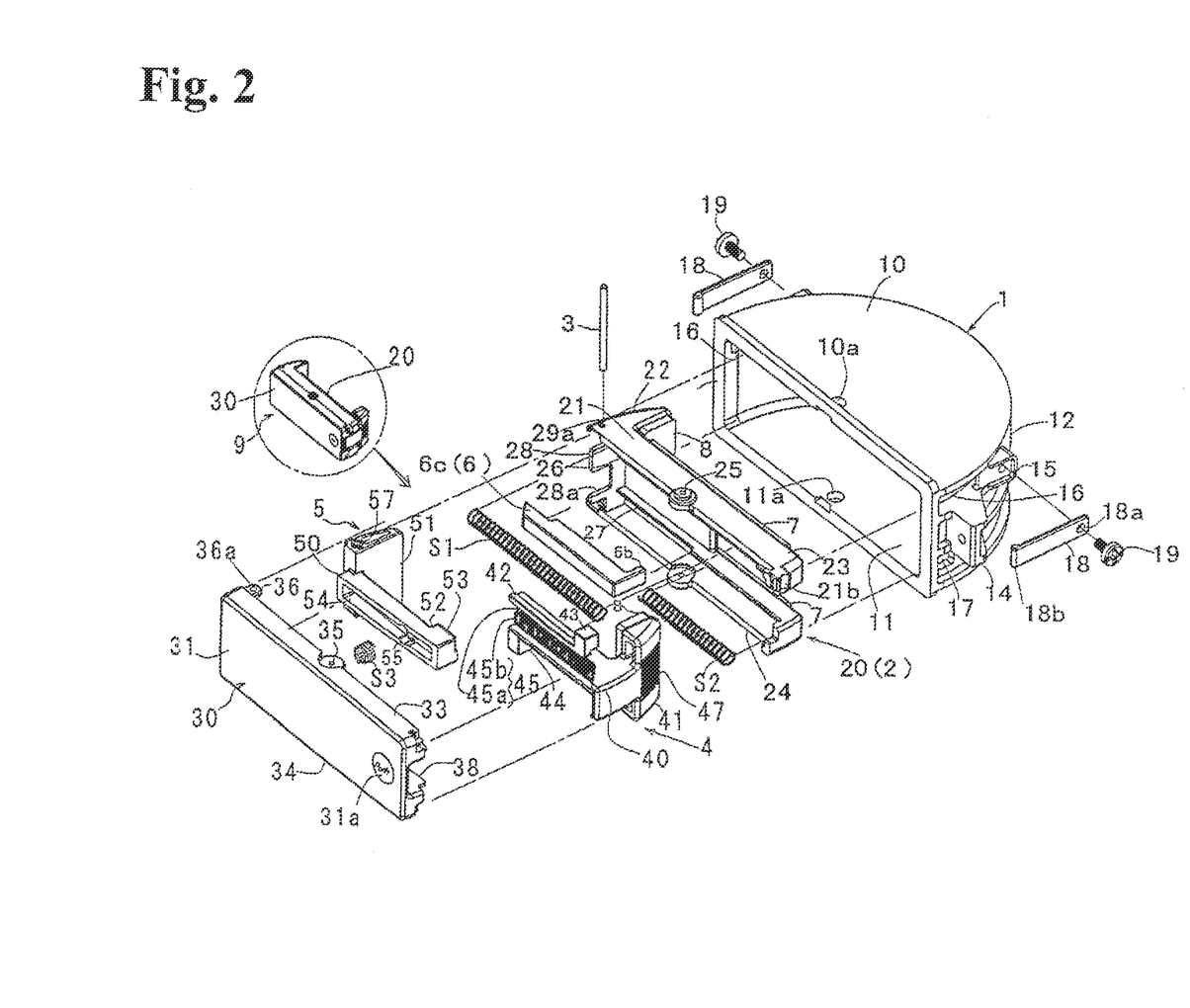
FIG. 2 is a structural diagram illustrating the abovementioned holder and an exploded view thereof together with the case.
Figure 3:
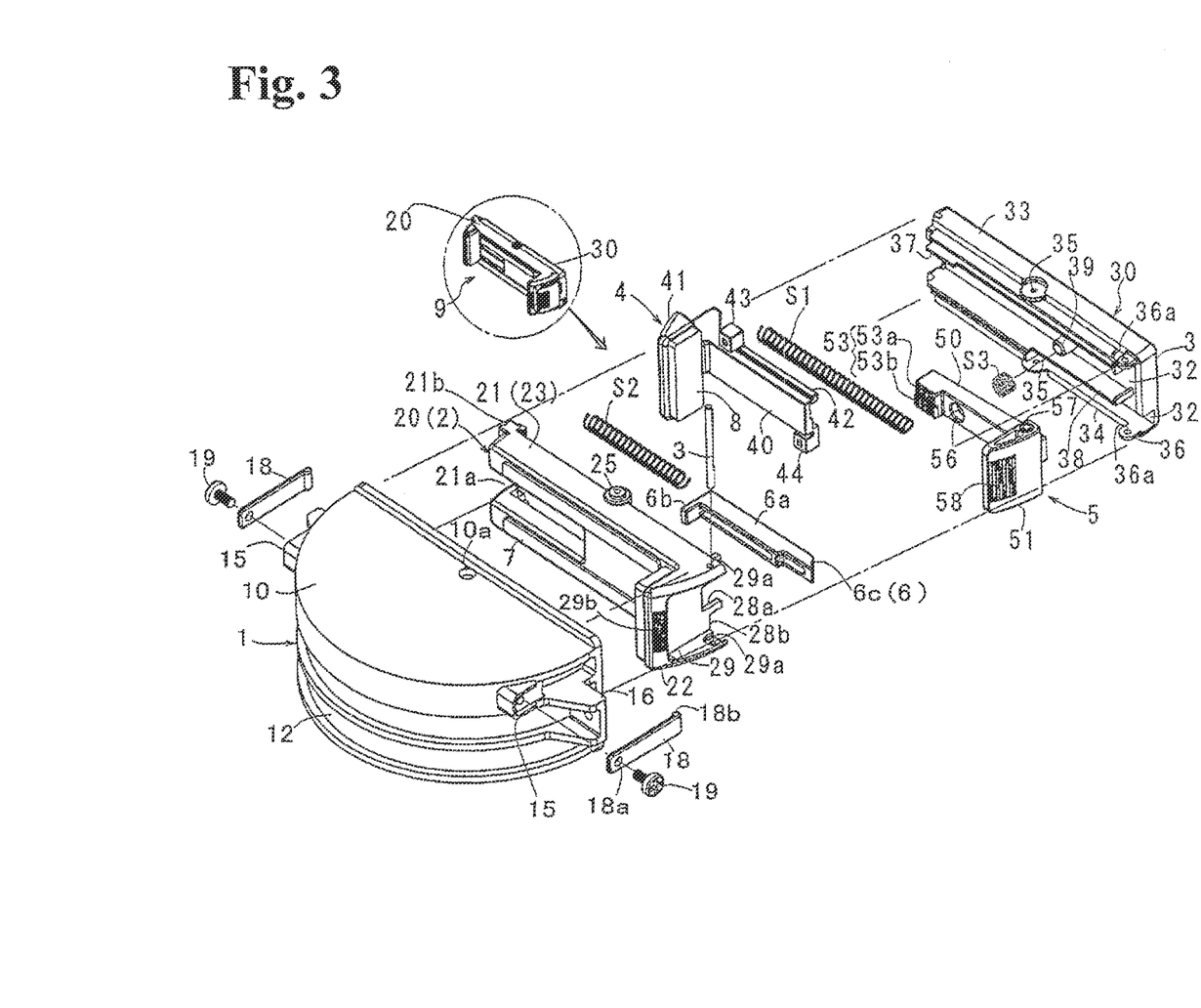
FIG. 3 is a view of the abovementioned holder and an exploded view thereof together with the case, viewed from a different direction than in FIG. 2.

The case 1, as illustrated in FIGS. 2 and 3, has a flat disk form having an open front side, an internal cavity is delineated by upper and lower walls 10 and 11 and a perimeter wall 12, and the front opening is fringed by a rectangular frame part 13. Shaft holes 10a and 11a are provided in the middle between left and right on the front side of the upper and lower walls 10 and 11. On the perimeter wall 12 there are provided: attachment parts 14 projecting on both sides; a sheet spring anchoring part 15 projecting on the rear end of each attachment part 14; a window part 16 opening the front of each anchoring part 15; and a coupling hole 17 opening a place proximal to the frame part 13 beneath one window part 16. A sheet spring 18 is anchored respectively on each anchoring part 15. Each sheet spring 13 is a roughly elongated rectangular metal spring, one end 18a is anchored by a screw 19 to the anchoring part 15, and the other end 18b serving as an elastic locking part is projected into the case 1 from the window part 16.

The above case 1 is placed in a recessed place being provided on a dashboard, side wall of a console box, or the like, on the side of a vehicle compartment, and is installed using the attachment parts 14 on both sides, in a state pivotally supporting the holder 9 to be capable of inversion. In this case, as a holding apparatus, the case 1 may be omitted, and a shape equivalent to the case 1 may be formed directly on the aforementioned dashboard, side wall of a console box, or the like.

In the holder 9, the base 2 includes a body 20 and a cover 30, and the general shape has a size sufficient to fit in the front opening of the case 1 substantially without a gap. The body 20 includes a placement part 21 corresponding to the horizontal part of the L shape, extending to the left and right of the case, and being used for placing an article K; and a stationary holding part 22 corresponding to the vertical part of the L shape, and being placed in the front-to-back direction of the case.

The placement part 21 has a guide groove 21a being cut out in a roughly C-shape excluding upper and lower portions toward a free end from roughly the middle from left to right; a recessed place 21b being provided on an upper face on the side of the guide groove 21a to be releasably coupled with the other end 18b of the sheet spring 18; shaft parts 25 respectively being provided in the middle of the upper and lower wall parts 23 and 24; a cushion material 7 being affixed on upper and lower portions surrounding the guide groove 21a on the side where the article K is placed; an upper support wall 26 being provided roughly in parallel to the upper wall part 23 with a space between, and a lower support wall 27 being provided roughly in parallel to the lower wall part 24 with a space between, on the side being covered by the cover 30; a vertical, wall, part 28 being placed projecting on the base end side (the front side of the stationary holding part 22); and a rectangular opening 28a and a small part 28b being provided on the vertical wall part 28.

The stationary holding part 22 has a cushion material 8 affixed to a holding surface, and has an outer face formed into a roughly concave part 29. The cushion material 8 is made with thick urethane, or the like, and is affixed with double-sided adhesive tape, or the like. The concave part 29 has holes 29a being provided on delineating upper and lower wall parts and coaxially running through the same; and a corrugated part 29b for design and mark being provided on a leading end side of an inner bottom wall of the concave part 29.

Meanwhile, the cover 30 is delineated by an outer face 31, an inner face 32, and upper and lower sides 33 and 34, into a rectangular shape having a size sufficient to be overlaid on the placement part 21, and has: a shaft hole 35 being provided in the middle from left to right of the upper and lower sides 33 and 34 and insertion-coupling with each shaft part 25; a protruding piece 36 having a hole 36a, being provided on one side and being aligned with the upper and lower holes 29a; an upper support wall 37 being provided roughly in parallel to the upper side 33 with a space between, a lower support wall 38 being provided roughly in parallel to the lower side 34 with a space between, and a shaft part 39 being placed projecting in the center part between the upper support wall 37 and the lower support wall 38, on the inner face 32; and a clearance part 32a connecting through one end side between the lower side 34 and the lower support wall 38. The outer face 31 is a design face, and "Push" is indicated on an indication part 31a on the upper right as needed.

Here, the spaces of the guide groove 21a, between the upper support wall 26 and the lower support wall 27, and between the upper support wall 37 and the lower support wall 38 are places for guiding the sliding of the slider 4. The upper and lower shaft parts 25 are insertion-coupled with the corresponding shaft holes 10a and 11a on the side of the case through corresponding shaft holes 34 on the side of the cover. In other words, each shaft part 25, together with the shaft holes 10a and 11a, configures a pivot part for supporting the base 2 to be capable of inversion on the case 1. The cushion material 7 includes felt, or the like, and is used for elastically receiving the article to protect from inadvertent occurrence of scratching, or the like. A coil spring being an urging member S1 for acting on the slider 4 is placed between the upper wall part 23 and the upper support wall 26. A stopper 6 is placed to be capable of moving in and out through the small window part 28b and the clearance part 32a, and a coil spring being a spring member 32 for acting on the stopper 6 is placed, between the lower wall part 24 and the lower support wall 27 and between the lower side 34 and the lower support wall 38. An operating button 5 is placed to be capable of swinging with a shaft 3 to be described as a fulcrum on between the upper support wall 26 and the lower support wall 27, in the rectangular opening 28a, and in the concave part 29 on the side of the body (between the upper support wall 37 and the lower support wall 38 on the side of the cover 30).

The slider 4 has a movable part 40 for being slid along the guide groove 21a on the side of the placement part; a movable holding part 41 being provided on one end side of the movable part 40 and being used for holding an article together with the stationary holding part 22; and a teeth part 45 being provided on a back face of the movable part 40. On the movable part 40 there are provided a narrow guide part 42 being provided in a longitudinal direction on an upper face; a boss-shaped spring bearing part 43 being provided on an end part of the guide part 42 on the side of the stationary holding part 22; and a boss-shaped strike bearing part 44 being provided on a lower face on an end part on the side opposite that of the stationary holding part 22. The cushion material 8 is affixed on the holding surface of the movable holding part 41, and a corrugated part 47 is provided on the operating surface. The cushion material 8 is made with thicker urethane than the cushion material 7 in the same manner as the cushion material 8 on the side of the base 2, and an article is received elastically whereby the article is clipped assuredly between the stationary holding part 22 and the movable holding part 41. The corrugated part 47 functions for design and slip prevention. The teeth part 45 has a two-stage configuration having upper teeth 45a and lower teeth 45b. The teeth 45a have a vertical teeth shape, and the teeth 45b have a teeth shape being non-vertical, that is, being at a prescribed tilt angle.

Figure 5A:
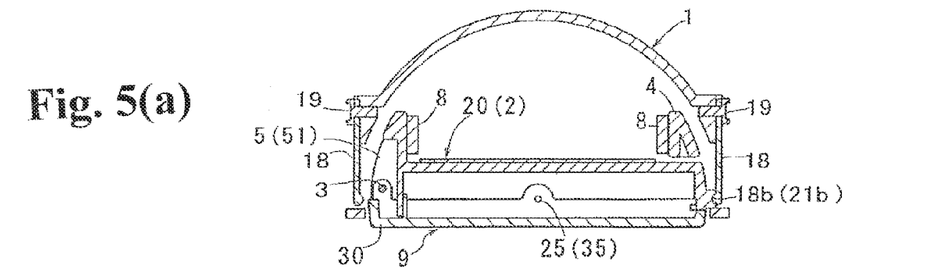
FIG. 5(a) is a sectional view along the line A-A in FIG. 4(a)
Figure 5B:
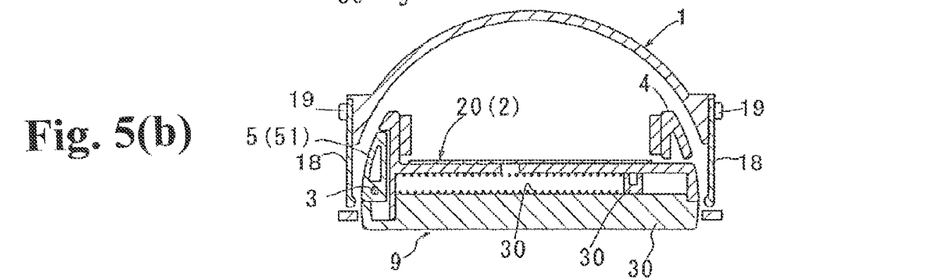
FIG. 5(b) is a sectional view along the line B-B in the same.
Figure 5C:
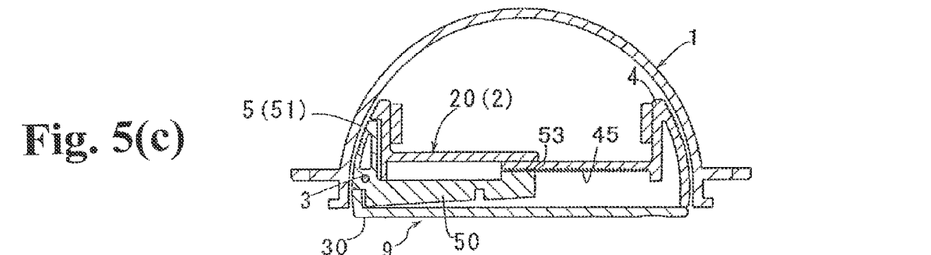
FIG. 5(c) is a sectional view along the line C-C in the same.
Figure 5D:
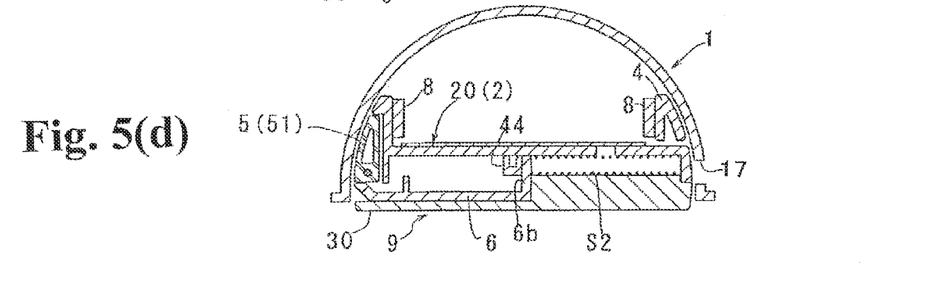
FIG. 5(d) is a sectional view along the line D-D in the same.
Figure 6A:
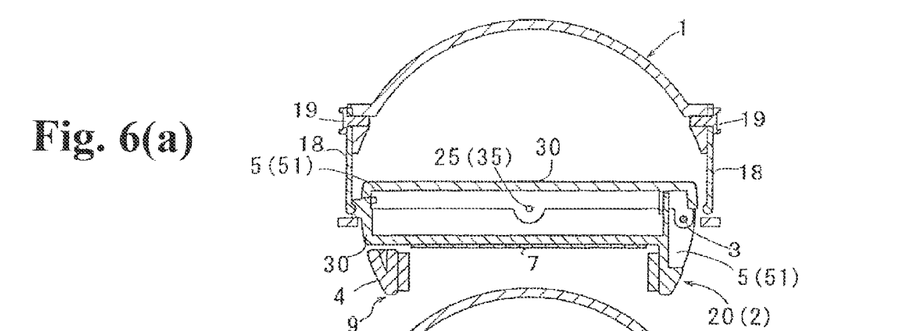
FIG. 6(a) is a sectional view along the line A1-A1 in FIG. 4(b)
Figure 6B:
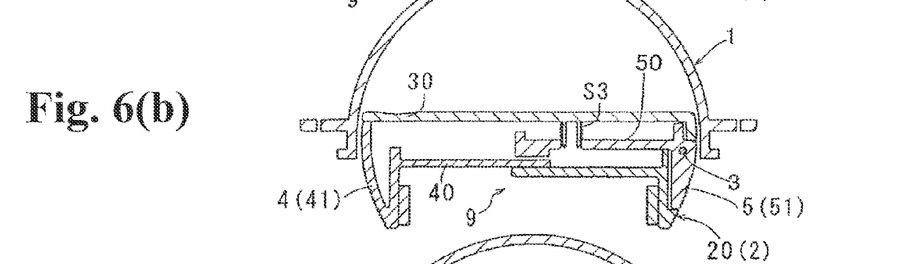
FIG. 6(b) is a sectional view along the line C1-C1 in the same.
Figure 6C:
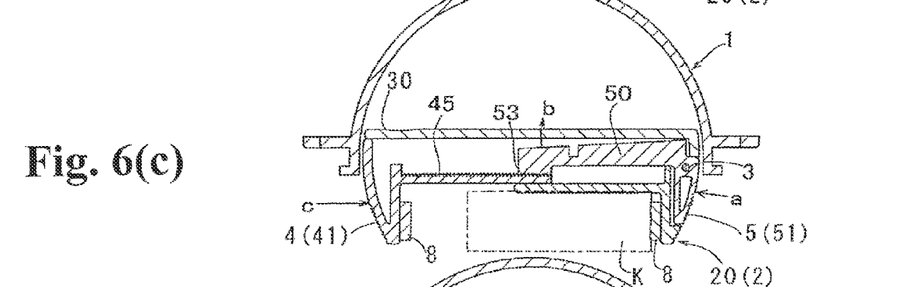
FIG. 6(c) is a sectional view along the line E-E in the same.
Figure 6D:
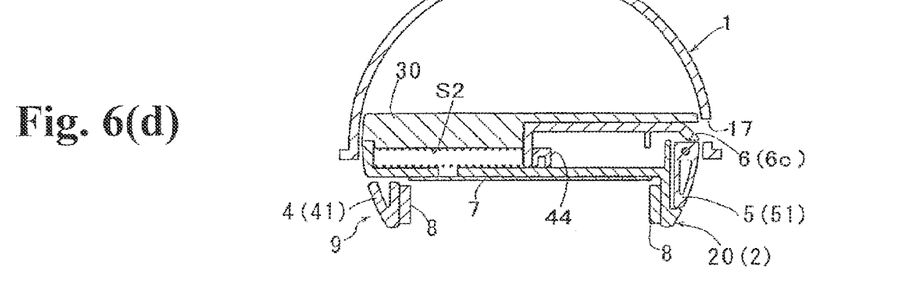
FIG. 6(d) is a sectional view along the line D1-D1 in the same.

The above slider 4 is incorporated in a state in which one end of the coil spring being the urging member S1 is locked on the vertical wall part 28 and the other end is locked on the bearing part 43 between the upper wall part 23 and the upper support wall 26, from a state in which the movable part 40 is placed in the guide groove 21a on the base 2. Also, the stopper 6 is placed to be capable of moving in and out through the small window part 28b and the clearance part 32a between the lower wall part 24 and the lower support wall 27 and between the lower side 34 and the lower support wall 38. However, at that time, the spring member S2 being the coil spring for acting on the stopper 6 is placed between an outer face of the base end bearing part 6b and a corresponding end part of the body 20, from a mode in which the bearing part 44 is placed on the inside of the base end bearing part 6b of the stopper 6 (see each (d) in FIGS. 5 to 7).

That is, the urging member S1 accumulates urging force when the slider 4 is slid in the direction in which the movable holding part 41 is moved closer to the stationary holding part 22, and the slider 4 is slid by that accumulated urging force to an initial position (a state in which the movable holding part 41 is at the maximum distance from the stationary holding part 22). The stopper 6 has a base end bearing part 6b in which one end side of a body 6a is formed into an L shape, and a leading-end claw part 6c in which the other end side of the body 6a is narrowed to be capable of moving in and out of the coupling hole 17. Also, this stopper 6 is placed slidably on the base 2 in the same direction as the slider 4. The restriction by the slider-side bearing part 44 is released when the slider 4 is moved in the direction of narrowing the holding width as in FIG. 7(d), whereby [the stopper] is slid by the urging force of the spring member 32, and couples with the coupling hole 17 provided on the case 1, so that inversion from the in-use state to the storage direction of the base 2 is checked. Also, [the stopper] is slid in the direction of releasing the coupling with the coupling hole 17 in linkage with the slider 4 being slid in the direction of moving away from the stationary holding part 22 by the urging force of the urging member S1.

The operating button 5 has an arm part 50, and an operating part 51 being placed projecting on one end of the arm part 50. The arm part 50 has a long and slender form with a hollow 54 inside, and has: a coupling part 52 being placed projecting on a front side face of a free end; a claw part 53 being provided on an end face of the coupling part 52; a spring placement part 55 being provided in a middle part of the cavity 54; and a hole part 56 being formed running through the depth of the placement part 55. The claw part 53 has a teeth form for engaging with the teeth part 45, and has a two-stage configuration having upper teeth 53a and lower teeth 53b. The teeth 53a have a vertical teeth form, and the teeth 53b have a teeth form being non-vertical, that is being at a prescribed tilt angle. The operating part 51 has a shape sufficient to fit in the concave part 29 on the side of the base body, and has a shaft hole 57 running through top to bottom, and a corrugated part 58 being provided on an outer face side of a leading end. The corrugated part 58 functions for design and slip prevention.

The operating part 51 of the above operating button 5 is received in the concave part 29 when the arm part 50 is placed between the upper support wall 26 and the lower support wall 27 and in the rectangular opening 28a. In this state, the cover 30 is placed in position on the body 20. At that time, each protruding piece 36 on the side of the cover is inserted between the upper wall part 23 and the operating part 51, and between the lower wall part 23 and the operating part 51, and the shaft part 39 on the side of the cover is insertion-coupled in a hole part 56 through a coil spring being an urging spring S3. Also, the body 20 and the cover 30 are integrated insertion-coupling and projecting the upper and lower shaft parts 25 in the corresponding hole parts 35, simultaneously inserting the shaft 3 through one hole 29a, a hole 36a on the side of the protruding piece, the shaft hole 57, a hole 36a on the side of the protruding piece, and the other hole 29b, and operating to join closely in the direction to be overlaid. That is, in this mode, the body 20 and the cover 30 are connected by the shaft 3 on one end side, the insertion-coupling between the shaft part 25 and the shaft hole 35 in the middle part, and a coupling structure not illustrated on the other end side.

The holder 9 is assembled in the above manner. In the assembled state, the operating button 5 is urged to rotate in the counterclockwise direction by the urging spring 53, and the claw part 53 is coupled with the teeth part 45 on the slider side, as illustrated in FIGS. 6(b) and (c). Therefore, the slider 4 is restricted against sliding by the coupling between the claw part 53 and the teeth part 45. Also, the above holder 9 (or base 2) is assembled onto the case 1 by insertion-coupling the upper and lower shaft parts 25 in the shaft holes 10a and 11a on the upper and lower faces 10 and 11, and is switchable to be inverted between a stored position in which the case opening is closed by a surface on the side opposite the side where the stationary holding part 22 and the movable holding part 41 are projected, in other words, the outer face of cover 30, and an in-use state in which the side where the stationary holding part 22 and the movable holding part 41 are projected is exposed, with a pivot part including each shaft part 25 and the shaft holes 10a and 11a as a fulcrum.

(Operation) A case in which the holder 9 is equipped on a dashboard of a vehicle through the case 1 is next imagined, and the operational characteristics are elucidated. The case 1 is normally installed in an embedded state in a dashboard, console, or other suitable place of an automobile.

Figure 1A:
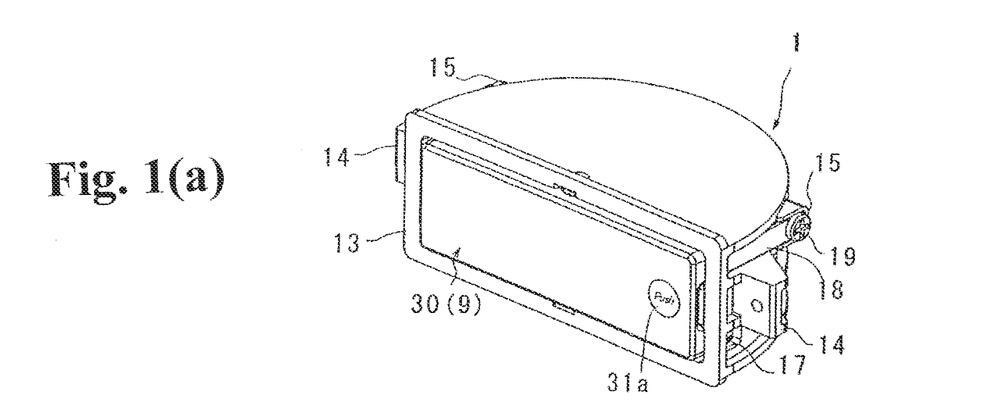
FIG. 1(a) is a perspective view of the stored position in which the holder is inserted in the case.
Figure 4A:
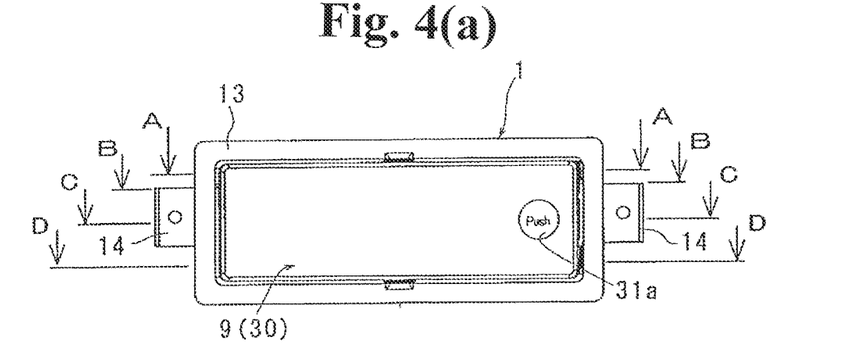
FIGS. 4(a) to 4(c) are front views of the holding apparatus corresponding to FIG. 1.

(1) Each (a) of FIGS. 1 and 4, and FIG. 5 illustrate the state in the stored position in which the holder 9 is received inside the case 1. In this stored state, the holder 9 is held in that state with the other end 18b of the sheet spring 18 being insertion-coupled in the recessed part 21b on the side of the case body, as presented in FIG. 5(a).

Figure 1B:
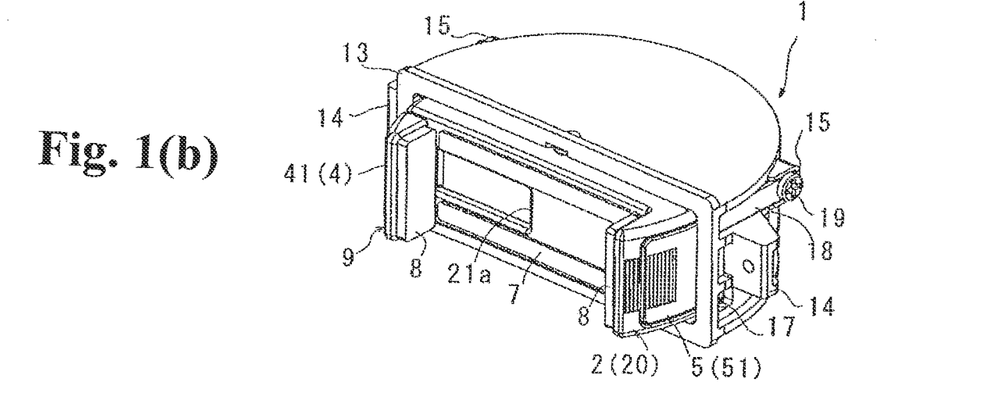
FIG. 1(b) is a perspective view of the in-use state.
Figure 1C:
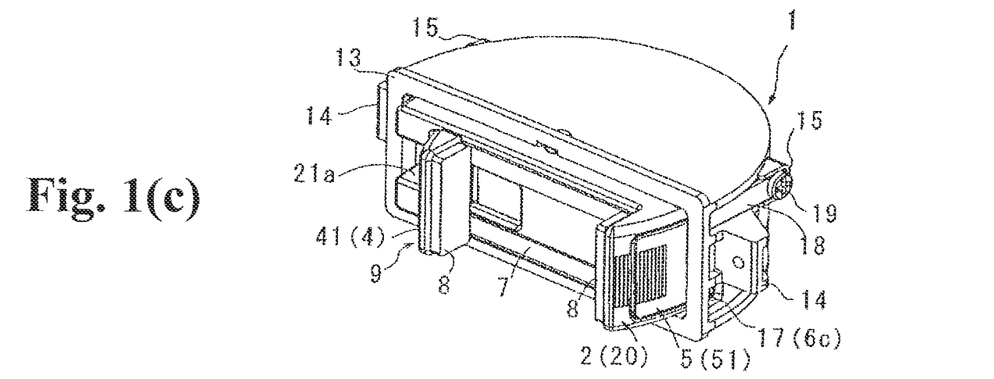
FIG. 1(c) is a perspective view of the state in which an article is held.
Figure 4B:
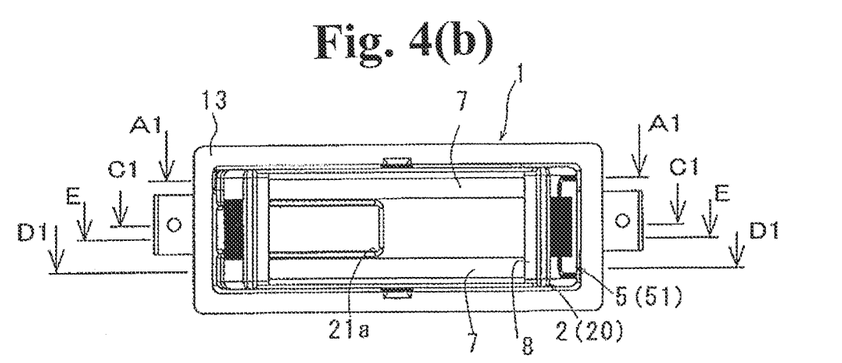
Figure 4C:
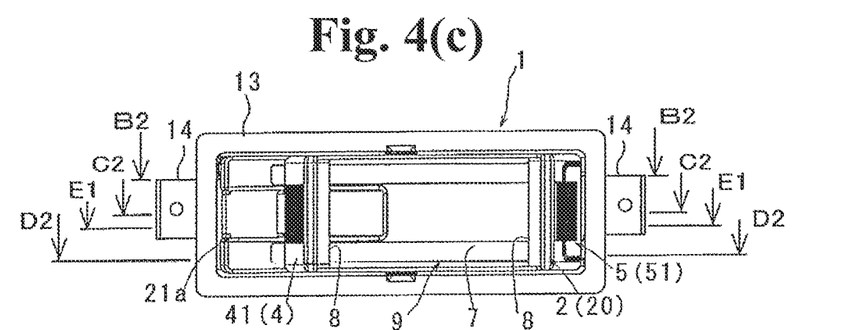

(2) Each (b) of FIGS. 1 and 4, and FIG. 6 illustrate the state (in-use position) in which the holder 9 was push operated from the above stored position by an operator's finger through the outer face of the cover 30, the insertion-coupling of the recessed place 21b to the other end 18b was elastically released, and the holder was rotated roughly 180 degrees in the counterclockwise direction. In this structure, when the holder 9 is switched from the stored position to the in-use position, the holder is restricted against further rotating in the same direction by locking device not illustrated. Therefore, the holder 9 is operated to rotate in the clockwise direction by pushing on the left side in the drawing when again switching from the in-use state to the stored state.

Figure 7A:
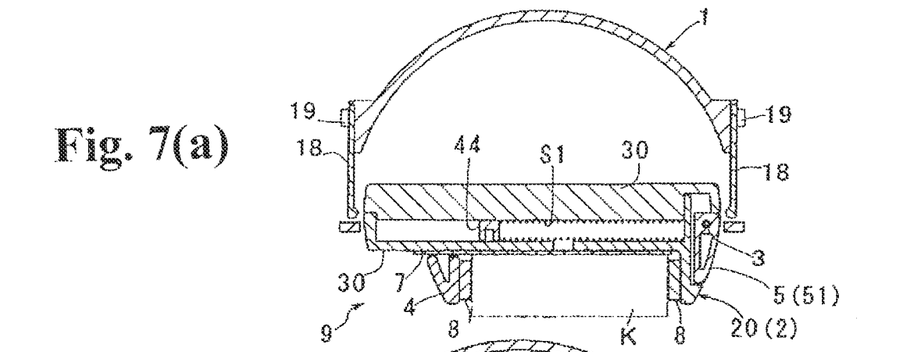
FIG. 7(a) is a sectional view along the line B2-B2 in FIG. 4(c)
Figure 7B:
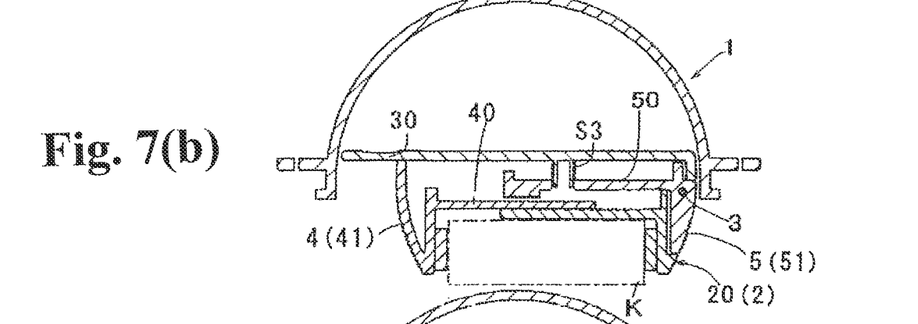
FIG. 7(b) is a sectional view along the line C2-C2 in the same.
Figure 7C:
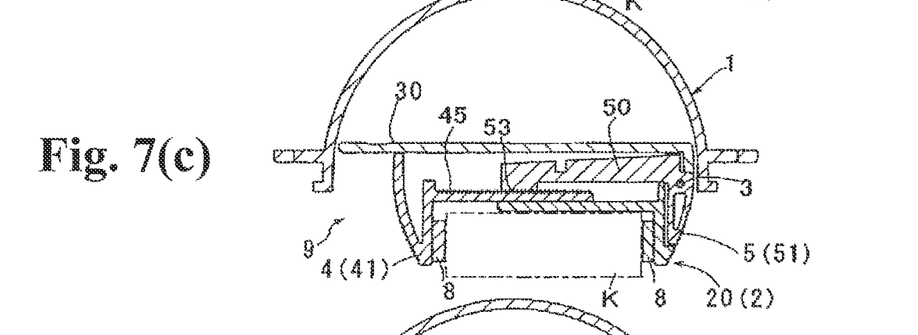
FIG. 7(c) is a sectional view along the line E1-E1 in the same.
Figure 7D:
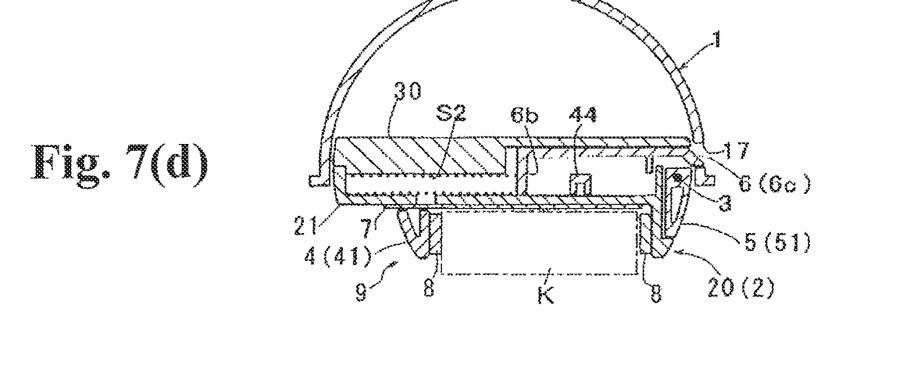
FIG. 7(d) is a sectional view along the line D2-D2 in the same.
Figure 8A:
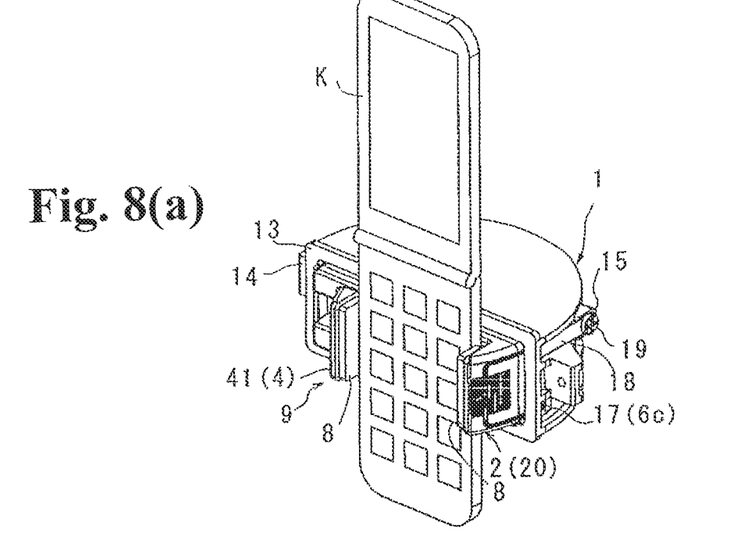
FIGS. 8(a) and 8(b) are explanatory diagrams illustrating a state in which an article is clipped in a different mode in the abovementioned holding apparatus.
Figure 8B:
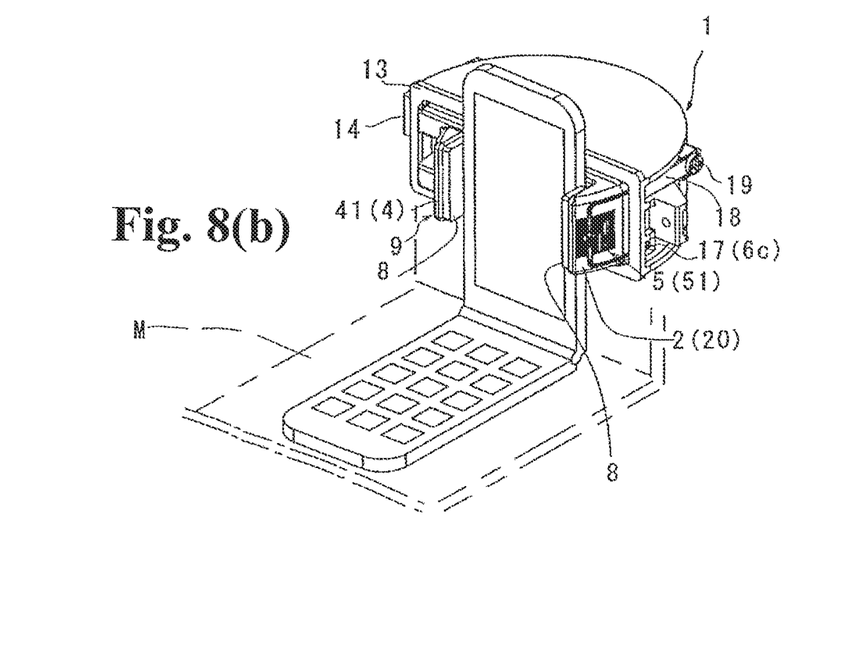

(3) FIG. 6(c) illustrates an outline of the operation in the case when a portable telephone K as one example of an article is clipped with the holder 9 in the in-use position, and FIGS. 7 and 8 illustrate the state in which the portable telephone K is clipped in the holder 9. That is, the slider 4 is restricted against sliding by the coupling between the claw part 53 and the teeth part 45 at the stage when the above holder 9 is switched from the stored position to the in-use position. Therefore, in order to clip the portable telephone K, the operating part 51 is push operated in the direction of arrow a against the urging force of the urging spring 53 as in FIG. 6(c). Doing thus, the operating button 5 is rotated in the clockwise direction, in other words, in the direction of arrow b, with the shaft 3 as a fulcrum, whereby the claw part 53 is decoupled from the teeth part 45. While maintaining this state, the operator operates the slider 4 to slide in the direction of arrow c against the urging force of the urging member S1 until the movable holding part 41 contacts with the corresponding side surface of the portable telephone K being placed on (the cushion material on) the placement part 21.

(4) In that state, when the finger is removed from the operating part 51 and the pushing force is released, the operating button 5 is urged to rotate in the counterclockwise direction by the urging spring S3, and the claw part 53 couples in the corresponding place of the teeth part 45 on the side of the slider. In this structure, because the claw part 53 has a two-stage configuration having the same kinds of upper and lower teeth 53a and 53b as the teeth part 45 on the slider side, shifting of the mutual engagement and misfiring originating therein are prevented, and a secure coupling is obtained. Also, the slider 4 is fixed in position as long as the claw part 53 is coupled with the teeth part 45. As a result, the portable telephone K is clipped between the stationary holding part 22 and the movable holding part 51. This clipped state is made secure by the additional force of the cushion members 8 on both sides, and is maintained as long as the operating button 5 is not pushed again.

(5) At the same time, in this structure, when the slider 4 is slid in the direction of arrow c illustrated in FIG. 6(c), the stopper 6 is automatically moved in the direction of the coupling hole 17 on the side of the case by the urging force of the spring member S2, in linkage with the operation of holding the portable telephone K between the stationary holding part 22 and the movable holding part 45 as illustrated in FIG. 7(c), and is coupled with the coupling hole 17. Therefore, inadvertent rotation of the holder 9 and malfunctioning originating therein, and the like, are prevented in advance by the coupling between the leading-end claw part 6c on the stopper side and the coupling hole 17, even when pushed to the stored position. In this structure, one side of the upper and lower sides of the portable telephone K is clipped between the stationary holding part 22 and the movable holding part 45 as in FIG. 8, but the lower side portion may be received by a lower holding part M as in FIG. 8(b).

(6) When again removing the clipped portable telephone K, a finger is placed on the operating part 51 and the operating button 5 is pushed against the urging force of the urging spring S3. Doing thus, the teeth part 45 is decoupled from the claw part 53, and the slider 4 is slid to the original initial position in FIG. 6 by the urging force of the urging member S1, and therefore the restraint on the portable telephone K is released. Then, by pushing the outer face 30 of the cover with the user's finger from the in-use position in FIG. 6, the recessed part 21b is elastically insertion-coupled to the other end 18b, and the holder 9 is held in the stored position. Also, in this structure, because a scheme for inversion-switching of the holder 9 on the case 1 is adopted, the projecting portion can be controlled compared with a drawer structure in the state in FIG. 6 or FIG. 7, whereby the structure is excellent in simplification and safety.

The present invention should substantially have the configuration specified in the claims, and details can be changed or developed with reference to this embodiment. As an example, although a case was used in the above mode, a part corresponding to the case is formed on the side of an apparatus in which the holder is placed.

The entire contents of the specification, claims, drawings, and abstract of Japanese Patent Application No. 274145 filed on Dec. 2, 2009 are incorporated by reference herein as a disclosure of the specification of the present invention.

What is claimed is:

1. A holding apparatus for removably holding an article, comprising:
   a base having a placement part for the article;
   a slider arranged slidably on said base; and
   an urging member for urging said slider,
   wherein said base has a stationary holding part disposed on one end side of said placement part, and an operating button supported to be capable of swinging through a pivot part,
   said slider has a movable holding part for holding said article together with said stationary holding part, and a teeth part arranged along a sliding direction,
   said operating button has an operating part on one end side of said pivot part, and a claw part on the other end side for coupling and decoupling with the teeth part of said slider,
   said operating button is constantly urged by an urging spring and restricts a sliding of the slider in a state in which said claw part is coupled with said teeth part, and said coupling is released by an operation opposing an urging force of said urging spring of said operating part so that said slider is slidable against an urging force of said urging member, and
   said base is switchable to be inverted on a case through the pivot part, between a stored position in which a case opening is closed by a surface on a side opposite a side where said stationary holding part is projected and an in-use state in which the side where said stationary holding part is projected is exposed from the case opening, and is elastically locked to be releasable both in said stored position and in the in-use state.

2. A holding apparatus according to claim 1, further comprising a stopper disposed slidably on said base in a same direction as said slider, being slid by an urging force of a spring member to couple with a coupling hole provided on said case and to prevent inversion of said base from the in-use state to the stored position, and being slid in a direction of releasing the coupling with said coupling hole concurrently with said slider being slid in a direction of moving away from said stationary holding part by the urging force of said urging member.

3. A holding apparatus according to claim 1, wherein said claw part has a teeth shape to engage with said teeth part, and has a two-stage configuration having an upper teeth and a lower teeth.

4. A holding apparatus according to claim 1, wherein said stationary holding part and/or movable holding part has a cushion material provided on a holding surface, and elastically holds said article through said cushion material.

* * * * *